United States Patent
Kurai et al.

(10) Patent No.: US 10,823,642 B2
(45) Date of Patent: Nov. 3, 2020

(54) SPOKE ANGLE DEVIATION AMOUNT MEASURING SYSTEM

(71) Applicant: HONDA MOTOR CO., LTD., Tokyo (JP)

(72) Inventors: Kenichiro Kurai, Tochigi (JP); Kento Aono, Tochigi (JP); Masahiro Murata, Tokyo (JP); Tatsuya Sakai, Tokyo (JP); Takayuki Ogawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 16/224,110

(22) Filed: Dec. 18, 2018

(65) Prior Publication Data

US 2019/0195739 A1 Jun. 27, 2019

(30) Foreign Application Priority Data

Dec. 21, 2017 (JP) .................................. 2017-245378

(51) Int. Cl.
*G01M 17/06* (2006.01)

(52) U.S. Cl.
CPC ................. *G01M 17/065* (2013.01)

(58) Field of Classification Search
CPC ... G01M 17/06; G01M 17/065; F16C 29/001; F16H 2057/02021; G01B 7/315; G01B 11/275
USPC .......................................... 73/116.01, 117.02
See application file for complete search history.

(56) References Cited

U.S. PATENT DOCUMENTS

| | | | | |
|---|---|---|---|---|
| 5,105,546 A | * | 4/1992 | Weise | G01B 7/315 33/203.12 |
| 6,443,020 B1 | * | 9/2002 | Lin | B62D 6/10 73/862.334 |
| 2004/0134080 A1 | * | 7/2004 | Hara | G01L 5/20 33/203.13 |
| 2005/0188753 A1 | * | 9/2005 | Kurai | G01L 5/20 73/146 |
| 2012/0326424 A1 | * | 12/2012 | Zaloga | F16D 1/12 280/775 |
| 2018/0094922 A1 | * | 4/2018 | Oki | G06T 7/60 |
| 2020/0003555 A1 | * | 1/2020 | Posey | B62D 1/00 |

FOREIGN PATENT DOCUMENTS

JP 2008-094137 4/2008
JP 4643537 12/2010

* cited by examiner

*Primary Examiner* — Eric S. McCall
(74) *Attorney, Agent, or Firm* — Rankin, Hill & Clark LLP (57) ABSTRACT

A spoke angle deviation amount measuring system (2) includes a first to fourth support units (21) to (24) configured to support rotatably a first to fourth tires (11) to (14), respectively. Shaft portions (31d) of the support units (21) to (24) are positioned by positioning caps (55) after a vehicle (3) is moved to a measuring position with a steering wheel (4) positioned neutral. With the tires (11) to (14) inclined at a toe angle with respect to a front-and-rear direction, when the vehicle (3) is caused to travel forwards, lateral stress is exerted on the support units (21) to (24), whereby the support units (21) to (24) turn about the corresponding shaft portions (31d). An angle sensor (40) detects turning angles of the support units (21) to (24). A control device (27) calculates a spoke angle deviation amount based on the detected turning angles.

4 Claims, 7 Drawing Sheets

SPOKE ANGLE DEVIATION AMOUNT MEASURING SYSTEM

BACKGROUND OF THE INVENTION

Field of the Invention

The present invention relates to a spoke angle deviation amount measuring system for a steering wheel.

Description of Related Art

Since a high operability is required on vehicles, various inspections are performed at an assembling factory. For example, Japanese Patent Publication No. 4643537 describes a spoke angle adjusting method for a steering wheel, and in this spoke angle adjusting method, as one of vehicle inspections, a spoke angle of a steering wheel in a vehicle straight traveling state is adjusted to be a neutral position.

In the spoke angle adjusting method for a steering wheel described in Japanese Patent Publication No. 4643537, a running state of a vehicle is artificially produced, and a steering wheel of the vehicle, in an artificially running state, is operated to measure multiple steer angles, while lateral forces on front wheels and lateral forces on rear wheels are measured at the multiple steer angles. Then, a spoke angle at which the relationship between the lateral forces on the front wheels and the lateral forces on the rear wheels indicates a straight traveling state of the vehicle, is calculated based on the measured steer angles and lateral forces, and a toe angle of the vehicle is adjusted so that the calculated spoke angle falls within a predetermined range.

In the spoke angle adjusting method for a steering wheel described in Japanese Patent Publication No. 4643537, to calculate the spoke angle, the steering wheel has to be operated multiple times from the state where the steering wheel is initially set, causing a problem in that the number of manhours is increased.

SUMMARY OF THE INVENTION

The present invention has been made in view of these situations, and an object of the invention is to provide a spoke angle deviation amount measuring system for measuring easily a spoke angle deviation amount without increasing the number of manhours involved.

According to an aspect of the invention, there is provided a spoke angle deviation amount measuring system for measuring a spoke angle deviation amount of a steering wheel when a vehicle is in a straight traveling state, the vehicle having a plurality of tires configured to rotate in a forward rotational direction about a first axis extending in a lateral direction as a center of rotation when the vehicle is traveling forwards and to rotate in a reverse rotational direction about the first axis as a center of rotation when the vehicle is reversing, the spoke angle deviation amount measuring system comprising a plurality of tire support units each having a tire support rotational member provided so as to rotate in the reverse rotational direction and configured to support each of the plurality of tires so as to rotate in the forward rotational direction by rotating in the reverse rotational direction and each configured to turn about a second axis extending in a vertical direction as a center of rotation, a turning unit configured to rotate each of the plurality of tires supported by the tire support rotational member in the forward rotational direction with a spoke angle of the steering wheel being zero and the steering wheel staying neutral and in a case where a lateral stress is generated in each of the plurality of tire support units, to turn each of the plurality of tire support units about the second axis as a center of rotation from its initial position according to the generated lateral stress, a turning angle detection unit configured to detect a turning angle of each of the plurality of tire support units from its initial position in a case where each of the plurality of tire support units is turned about the second axis as a center of rotation by the turning unit, and a spoke angle deviation amount calculation unit configured to calculate a spoke angle deviation amount of the steering wheel based on the detected turning angle, detected by the turning angle detection unit. When referred to herein, calculation includes derivation of one by retrieving it from plurality as well as derivation through calculation.

With each of the plurality of tires being inclined in a left-and-right direction (a toe angle) with respect to a front-and-rear direction with the steering wheel staying neutral, when each of the plurality of tires supported by the tire support rotational members rotates in the forward rotational direction, a lateral stress is generated in each of the plurality of tire support units, whereby the tire support units turn about the second axis as a center of rotation.

According to the spoke angle deviation amount measuring system of the present invention, since the turning angle of the tire support unit from its initial position is detected to calculate the spoke angle deviation amount based on the detection result, the spoke angle deviation amount can easily be measured as the steering wheel is fixed.

In addition, the spoke angle deviation amount measuring system preferably comprises a spoke angle measuring unit configured to measure a spoke angle of the steering wheel, and the steering wheel is preferably is positioned in a neutral state based on the spoke angle measured by the spoke angle measuring unit.

According to this configuration, the steering wheel can be positioned neutral in an ensured manner, thereby making it possible to enhance the measuring accuracy.

Further, each of the plurality of tire support units is preferably provided movably and preferably comprises a fixing unit configured to fix a position of each of the plurality of tire support units to the second axis and release the fixing of the position of each of the plurality of tire support units to the second axis, and the fixing unit preferably releases the fixing of the position of each of the plurality of tire support units to the second axis with each of the plurality of tires not being supported on the corresponding tire support rotational member and fixes the position of each of the plurality of tire support units to the second axis with each of the plurality of tires being supported on the corresponding tire support rotational member.

According to this configuration, since each of the plurality of tire support units is fixed to the second axis when each of the plurality of tires is supported on the corresponding tire support rotational member, the turning angle of the tire support unit can be detected accurately, compared with one in which a position of each of a plurality of tires is fixed to a second axis before it is supported on a tire support rotational member or one in which a position of each of a plurality of tires is not fixed to a second axis even after it is supported on a tire support rotational member.

The spoke angle deviation amount calculation unit preferably calculates a spoke angle deviation amount of the steering wheel by use of Expression (1) below:

$$\beta = \alpha - ((\theta_1 - \theta_2)/G) \qquad \text{(Expression 1)}$$

Where θ1 denotes the detected turning angle of a tire support unit among the plurality of tire support units which supports a front tire of the plurality of tires, θ2 denotes the detected turning angle of a tire support unit of the plurality of tire support unit which supports a rear tire of the plurality of tires, α denotes a steering angle of the steering wheel, G denotes a steering reduction gear ratio indicating a steering angle change to a toe angle change of the vehicle, and β denotes a spoke angle deviation amount of the steering wheel. In a case in which there is a plurality of front tires and rear tires, the total detected turning angle of each of the plurality of tire support units which support the plurality of tires is θ1 and θ2, respectively.

According to this configuration, the spoke angle deviation amount can be calculated easily and accurately.

DETAILED DESCRIPTION OF THE PREFERRED EMBODIMENT

Hereinafter, referring to drawings, an embodiment of the invention will be described.

Figure 1:
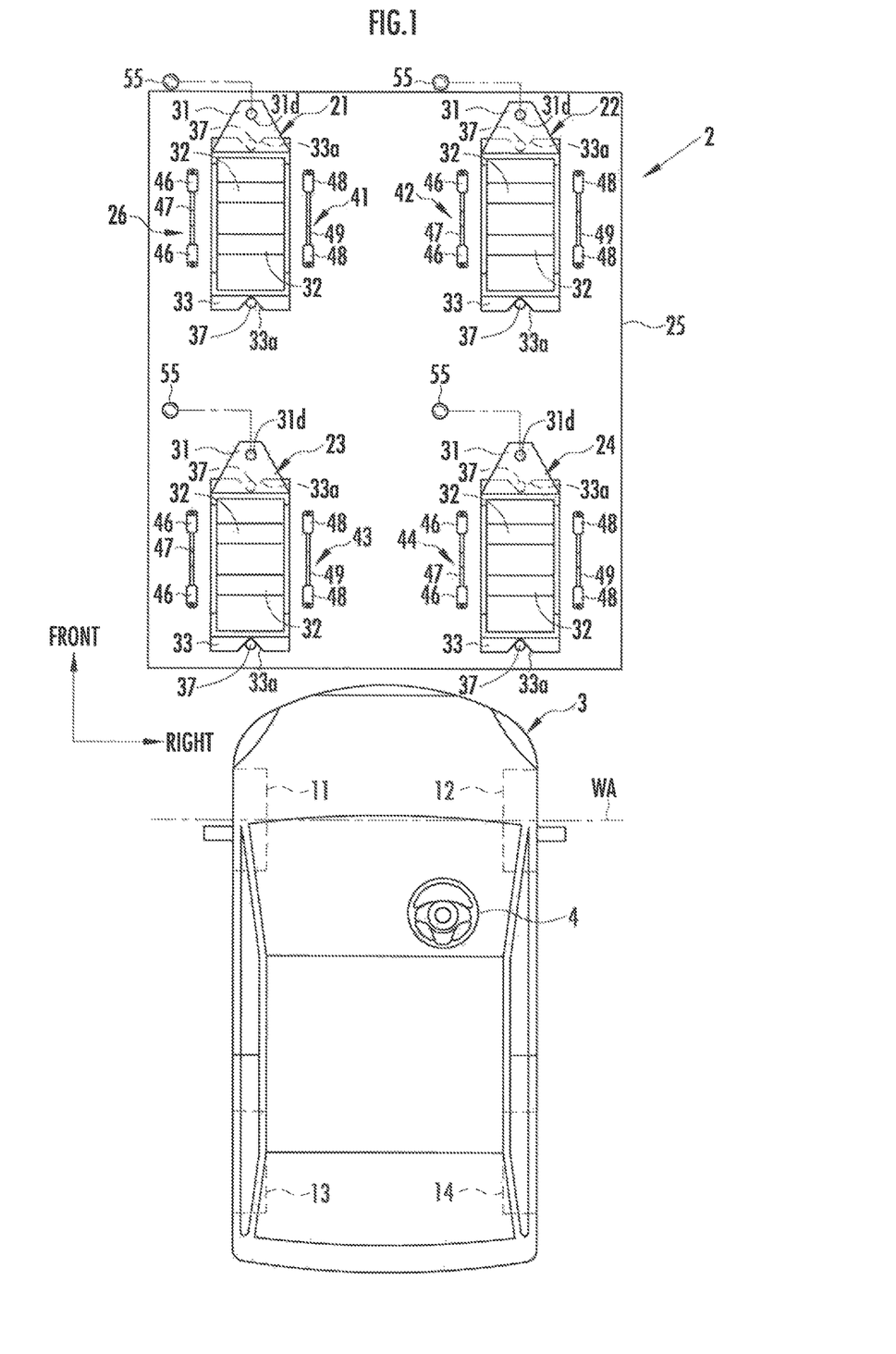
FIG. 1 is a plan view illustrating a spoke angle deviation amount measuring system of the present invention and a vehicle.
Figure 2:
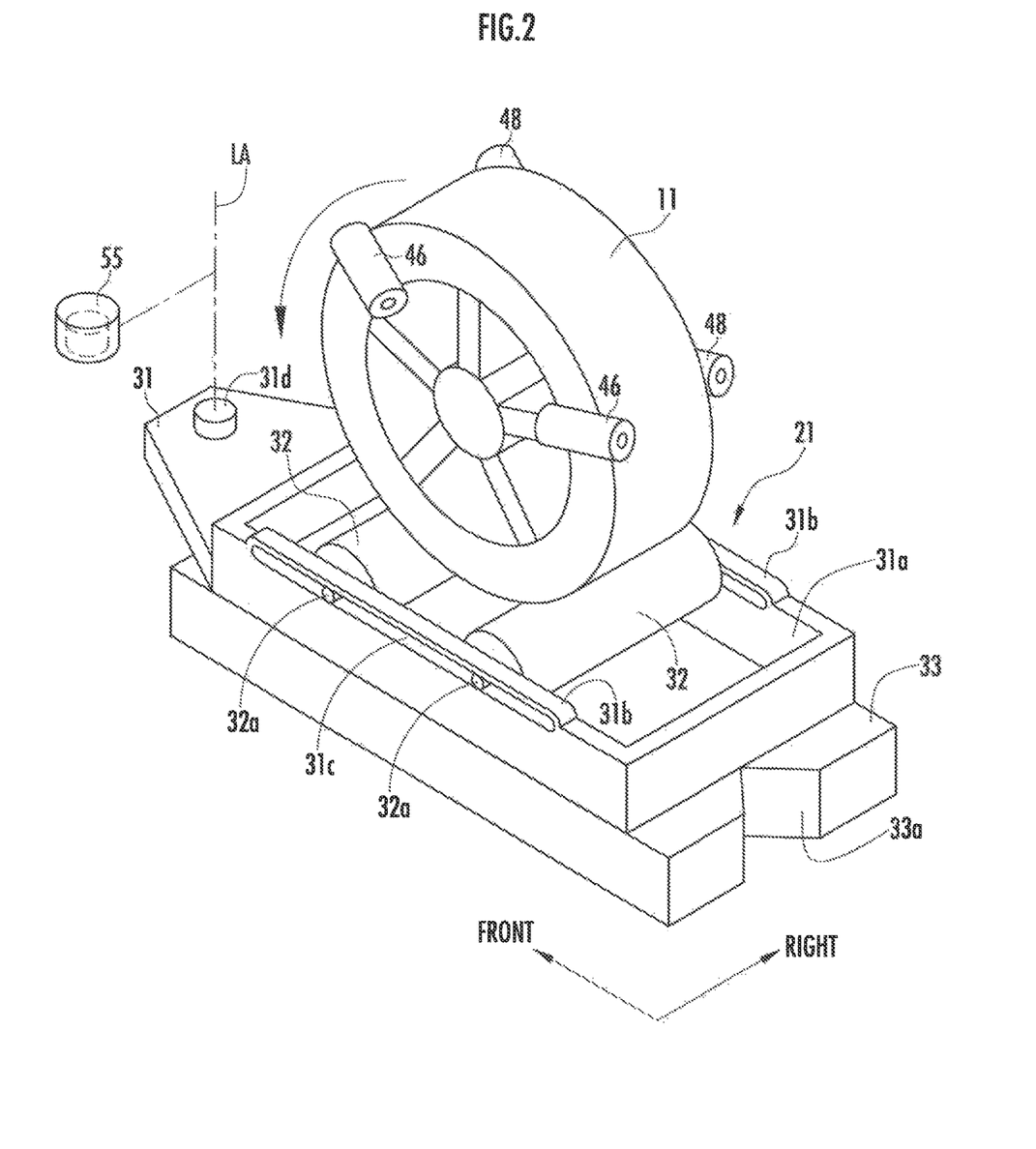
FIG. 2 is a perspective view illustrating a first support unit.
Figure 3:
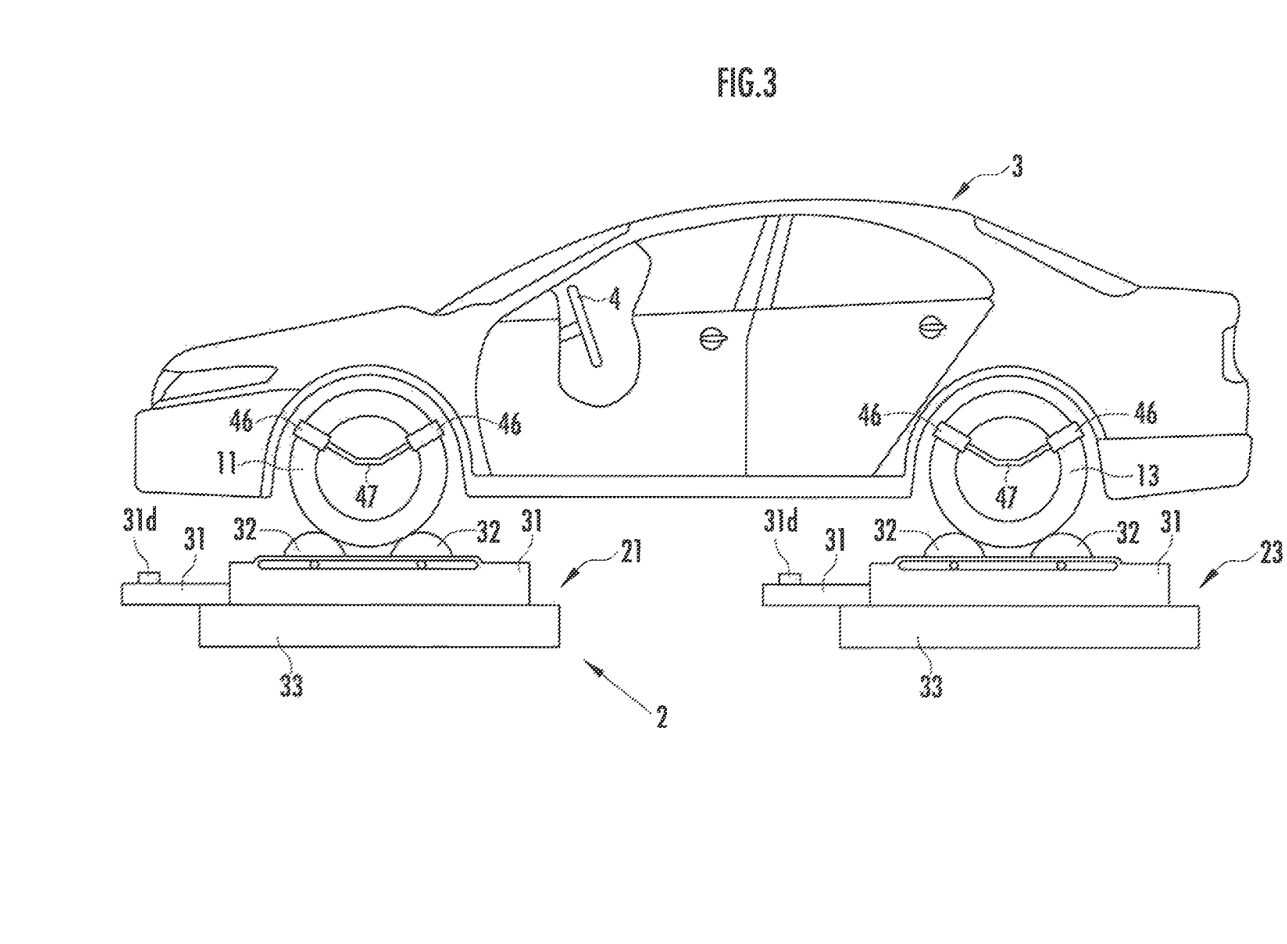
FIG. 3 is a side view illustrating the spoke angle deviation amount measuring system and the vehicle.

As illustrated in FIGS. 1 to 3, a spoke angle deviation amount measuring system 2 measures a spoke angle deviation amount of a steering wheel 4 mounted on a vehicle 3 when the vehicle is caused to travel straight ahead with the steering wheel 4 located in a neutral position. In FIG. 1, the steering wheel 4 is illustrated schematically.

Figure 4:
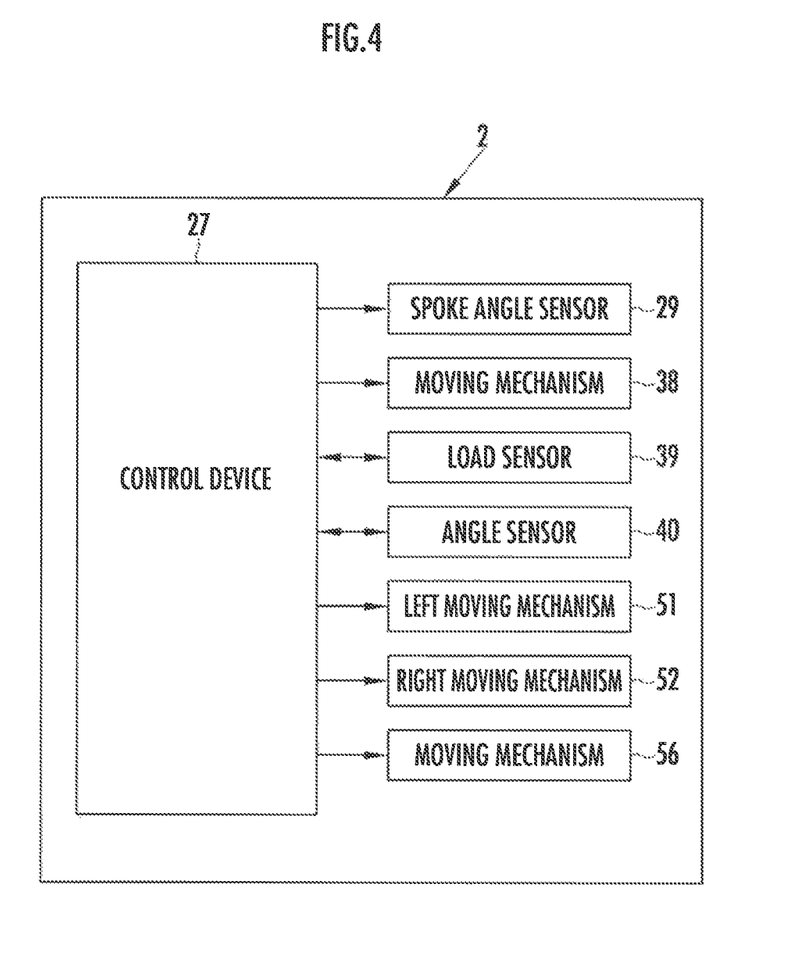
FIG. 4 is a block diagram illustrating an electric configuration of the spoke angle deviation amount measuring system.

The spoke angle deviation amount measuring system 2 includes first to fourth support units 21 to 24 configured to support rotatably first to fourth tires 11 to 14 of the vehicle 3, a base 25 configured to support the first to fourth support units 21 to 24 so as to move and turn, a positioning device 26, a control device 27 (refer to FIG. 4), and a spoke angle sensor 29 (refer to FIG. 4) configured to measure a spoke angle of the steering wheel 4. The spoke angle sensor 29 may be provided on the vehicle 3 or may not be provided. When the spoke angle sensor 29 is not provided, the steering wheel 4 is located in the neutral position visually.

The first to fourth tires 11 to 14 are a left front tire, a right front tire, a left rear tire, and a right rear tire, respectively and rotate about a lateral axis WA extending in the lateral direction (a first axis) as a center of rotation.

The first support unit 21 comprises a support table 31, two support rollers 32 (a tire support rotational member) provided on the support table 31 so as to rotate about a lateral axis as a center of rotation and a positioning plate 33 attached to a lower surface of the support table 31. The first support unit 21 is attached to the base 25 so as not only to move in a left-and-right direction but also to turn about a vertical axis LA (a second axis) extending in a vertical direction as a center of rotation.

The support table 31 has an opening 31a formed therein, and the two support rollers 32 are accommodated rotatably in the opening 31a.

A projecting support portion 31b is formed on a left end portion and a right end portion of an upper surface of the support table 31. An elongated support hole 31c is formed in each of the support portions 31b to support rotatably respective shaft portions 32a of the two support rollers 32. Since the support hole 31c is formed into the shape of an elongated hole, the respective shaft portions 32a of the two support rollers 32 can move in the front-and-rear direction, whereby the two support rollers 32 can move individually in the front-and-rear direction.

A projecting shaft portion 31d is formed at a front end portion of the upper surface of the support table 31, and this projecting shaft portion 31d constitutes a turning shaft portion when the first support unit 21 is turned.

The first tire 11 is placed on each of the two support rollers 32, and the two support rollers 32 are supported by a support member (not shown) so as not to change a pitch between the two support rollers 32 in the front-and-rear direction. When the first tire 11 is rotated in a counterclockwise direction, when seen from a left side, so as to move the vehicle 3 ahead, the two support rollers 32 rotate individually in a clockwise direction.

A positioning recessed portion 33a is formed at each of a front end and a rear end of the positioning plate 33. When positioning shafts 37 of the positioning device 26 are inserted individually in the two positioning recessed portions 33a, the first support unit 21 is positioned with respect to the left-and-right direction.

As with the first support unit 21, the second to fourth support units 22 to 24 each comprise a support table 31, two support rollers 32, and a positioning plate 33, and a detailed description thereof will be omitted here. The first support unit 21 and the third support unit 23 are disposed in the same position with respect to the left-and-right direction, and the second support unit 22 and the fourth support unit 24 are disposed in the same position with respect to the left-and-right direction. When referred to here, the "same" includes a slight deviation.

In this embodiment, the support rollers 32 of the first support unit 21 and the second support unit 22 and the support rollers 32 of the third support unit 23 and the fourth support unit 24 are coupled together so that when one is rotated, the other is also rotated, whereby when a forward travel accelerator pedal control is performed to cause the vehicle 3 set on the spoke angle deviation amount measuring system 2 to travel forwards, all the first to fourth tires 11 to 14 are rotated.

The positioning device 26 comprises a total of eight positioning shafts 37 which are inserted into the two positioning recessed portions 33a of each of the first to fourth support units 21 to 24. The positioning shafts 37 are provided movably and are moved by, for example, a moving mechanism 38 (refer to FIG. 4) having a motor, a gear and the like. The moving mechanism 38 is controlled to be driven by the control device 27.

The spoke angle deviation amount measuring system 2 comprises a load sensor 39 (refer to FIG. 4) configured to measure a load exerted on the positioning shafts 37 when the eight positioning shafts 37 are moved to be inserted into the pairs of positioning recessed portions 33a of the first to fourth support units 21 to 24 to position the first to fourth support units 21 to 24.

The spoke angle deviation amount measuring system 2 comprises an angle sensor 40 (a turning angle detection unit) (refer to FIG. 4) configured to detect a turning angle of each of the first to fourth support units 21 to 24 when the first to fourth support units 21 to 24 turn about the corresponding shaft portions 31d. A unit configured to detect a turning angle of the first to fourth support units 21 to 24 is not limited to the angle sensor and hence may be a switch configured to be depressed when the first to fourth support units 21 to 24 turn or an image processing unit configured to image process an image captured by a camera.

The positioning device 26 comprises a first to fourth clamp units 41 to 44 configured to clamp the first to fourth tires 11 to 14, respectively, from the lateral direction.

The first clamp unit 41 comprises two rotatable left rollers 46 configured to be brought into abutment with a left side surface of the first tire 11, a left support shaft 47 configured to support the two left rollers 46 rotatably, two rotatable right rollers 48 configured to be brought into abutment with a right side surface of the first tire and a right support shaft 49 configured to support rotatably the two right rollers 48. In FIG. 2, the illustration of the left support shaft 47 is omitted.

The two left rollers 46 are disposed in such a manner as to be spaced apart in a front-and-rear direction. The front left roller 46 is brought into abutment with a front portion of the left side surface of the first tire 11, and the rear left roller 46 is brought into abutment with a rear portion of the left side surface of the first tire 11. The two left rollers 46 are rotated as the first tire 11 rotates and clamp the first tire 11 rotatably (refer to FIGS. 5 and 6). FIG. 6 illustrates a state where the first to fourth support units 21 to 24 turn about the shaft portions 31d due to lateral stress when the forward travel accelerator pedal control is performed to cause the vehicle 3 set on the spoke angle deviation amount measuring system 2 to travel forwards.

The left support shaft 47 configured to support rotatably the two left rollers 46 is provided movably and is moved by, for example, a left moving mechanism 51 (refer to FIG. 4) having a motor, a gear and the like. The left moving mechanism 51 is controlled to be driven by the control device 27.

Similarly, the two right rollers 48 are disposed in such a manner as to be spaced apart in a front-and-rear direction. The front right roller 48 is brought into abutment with a front portion of the right side surface of the first tire 11, and the rear right roller 48 is brought into abutment with a rear portion of the right side surface of the first tire 11. The two right rollers 48 rotate as the first tire 11 rotates and clamp rotatably the first tire 11 (refer to FIGS. 5 and 6).

The right support shaft 49 configured to support rotatably the two right rollers 48 is provided movably and is moved by, for example, a right moving mechanism 52 (refer to FIG. 4) having a motor, a gear and the like. The right moving mechanism 52 is controlled to be driven by the control device 27. A clamping force exerted by the first clamp unit 41 is not great, and when the first tire 11 turns in the left-and-right direction, the first clamp unit 41 moves together with the first tire 11.

As with the first clamp unit 41, the second to fourth clamp units 42 to 44 each comprise two left rollers 46, a left support shaft 47, two right rollers 48 and a right support shaft 49, and a detailed description thereof will be omitted here.

The positioning device 26 comprises four positioning caps 55 (fixing units) configured to fit individually on the respective shaft portions 31d of the first to fourth support units 21 to 24 to position the shaft portions 31d in such a state that the shaft portions 31d can rotate. The positioning caps 55 may not be provided, and in this case, the shaft portions 31d may be kept positioned at all times.

The positioning caps 55 are provided movably and are moved by, for example, a moving mechanism 56 (refer to FIG. 4) having a motor, a gear and the like. The moving mechanism 56 is controlled to be driven by the control device 27. Positioning devices are not limited to the positioning caps 55, and hence, any device can be adopted as long as it can position the shaft portion 31d in such a state that the shaft portion 31d can rotate. For example, a configuration may be adopted in which a hole is formed in a central portion of the shaft portion 31d, and a shaft is inserted into the hole formed so that the shaft portion 31d can be positioned in such a state that the shaft portion 31d can rotate.

[Measurement of Spoke Angle Deviation Amount]

Figure 7:
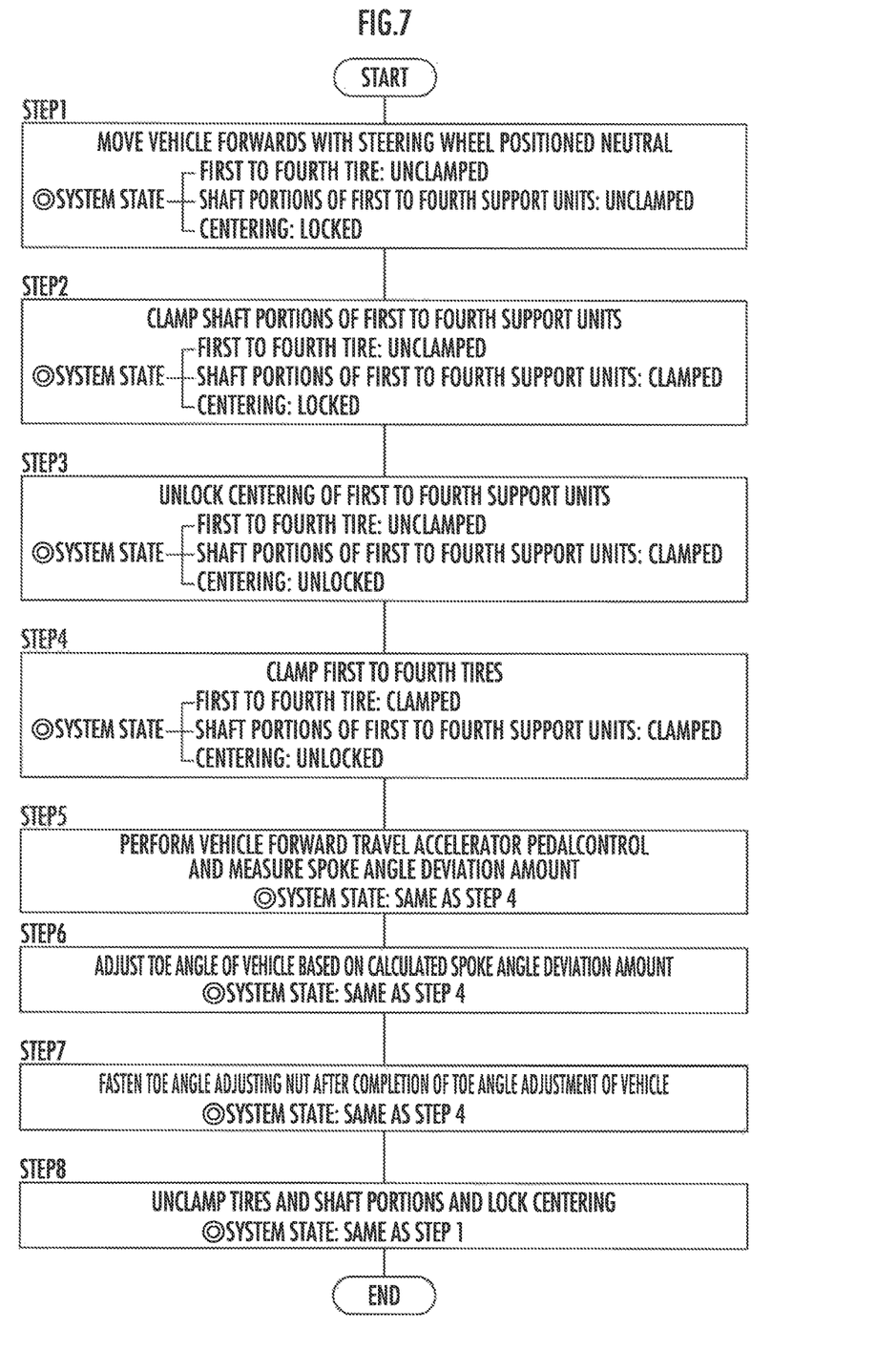
FIG. 7 is a flow chart illustrating a flow of operations of measuring a spoke angle deviation amount to adjust a toe angle.

FIG. 7 shows a flow chart illustrating a process of measuring a spoke angle deviation amount of the steering wheel 4 by use of the spoke angle deviation amount measuring system 2.

As illustrated in FIG. 7, firstly, an operator positions the steering wheel 4 in a neutral position based on a spoke angle detected by the spoke angle sensor 29 and causes the vehicle 3 to travel forwards in this state (STEP 1).

In STEP 1, the control device 27 drives the moving mechanism 38 to move the eight positioning shafts 37 in such a manner that the positioning shafts 37 are inserted into the pairs of positioning recessed portions 33a of the first to fourth support units 21 to 24 (refer to FIG. 1). This puts the first to fourth support units 21 to 24 in a positioned state (a state where the centering of the first to fourth support units 21 to 24 is locked).

In addition, in STEP 1, the control device 27 positions the four positioning caps 55 in positions where the positioning caps 55 are spaced apart from the respective shaft portions 31d of the first to fourth support units 21 to 24, whereby the shaft portions 31d are not positioned in place (unclamped). Further, in STEP 1, the control device 27 positions the first to fourth clamp units 41 to 44 in positions where the first to fourth clamp units 41 to 44 are spaced apart from the first to fourth tires 11 to 14, whereby the first to fourth tires 11 to 14 are not clamped (unclamped).

In STEP 1, at the spoke angle deviation amount measuring system 2, the first to fourth tires 11 to 14 are unclamped, the shaft portions 31d of the first to fourth support units 21 to 24 are unclamped, and the centering of the first to fourth support units 21 to 24 is locked.

Figure 5:
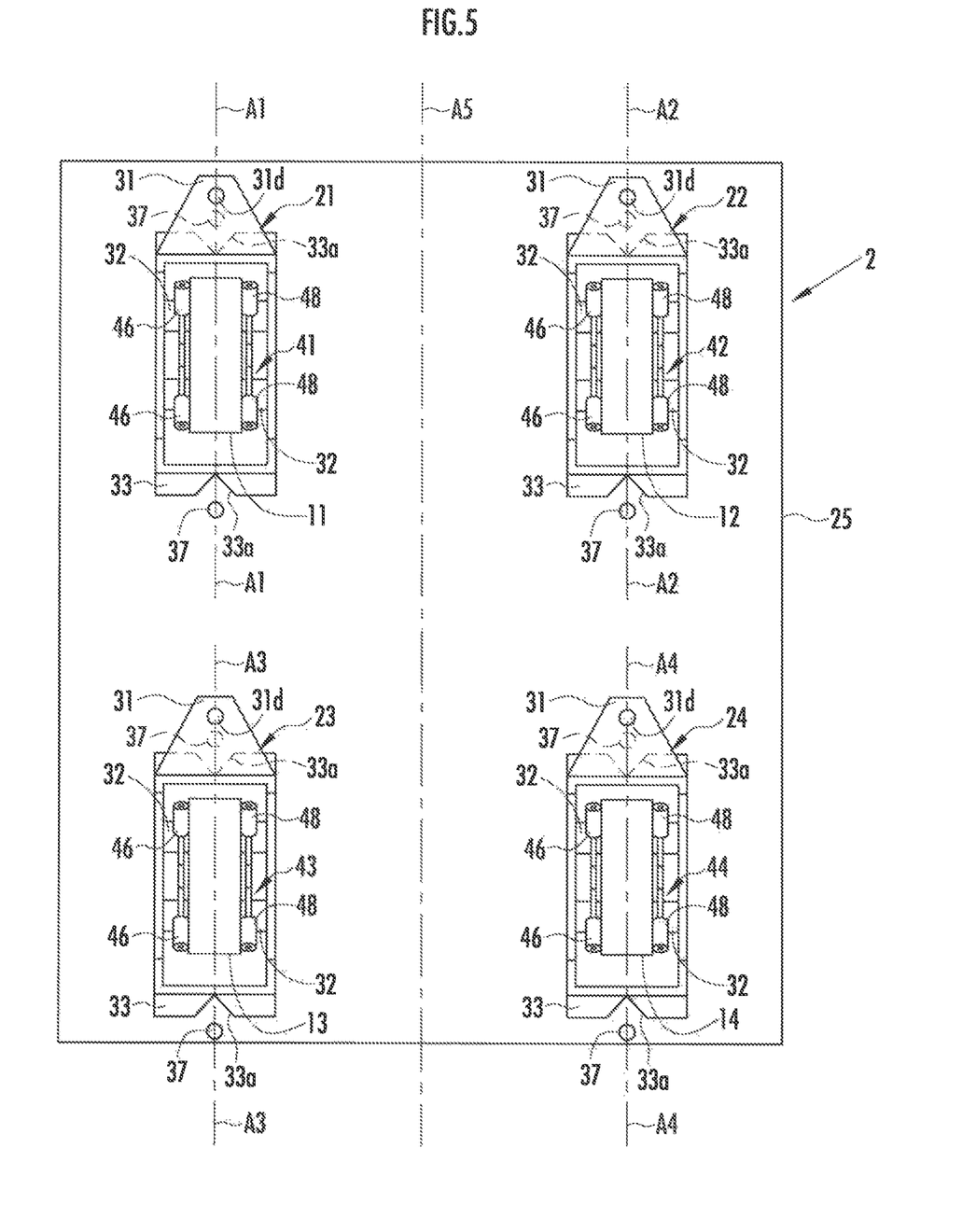
FIG. 5 is a plan view illustrating the spoke angle deviation amount measuring system on which tires of the vehicle are rested.
Figure 6:
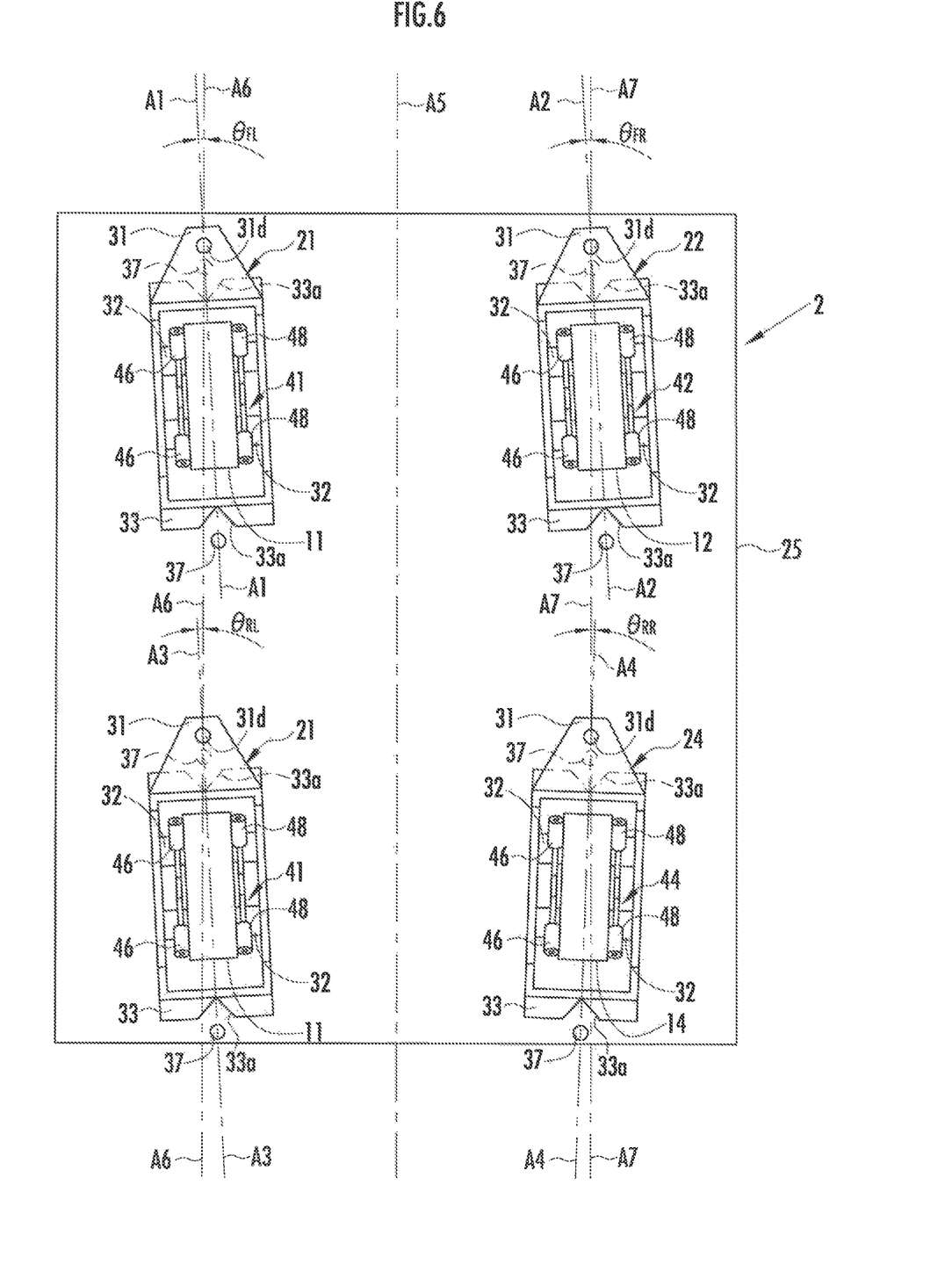
FIG. 6 is a plan view illustrating the spoke angle deviation amount measuring system in which first to fourth support units are turned by a lateral force with the tires of the vehicle rested on them.

When the vehicle 3 travels ahead to arrive at a measuring position where the first to fourth tires 11 to 14 are supported rotatably by the pairs of support rollers 32 of the first to fourth support units 21 to 24, the vehicle 3 cannot travel ahead any further and stops (refer to FIG. 5).

After having confirmed that the vehicle 3 has arrived at the measuring position, the control device 27 drives the moving mechanism 56 based on an instruction from the operator to move the four positioning caps 55 to positions where the positioning caps 55 fit on the respective shaft portions 31d of the first to fourth support units 21 to 24 (STEP 2). This positions the first to fourth support units 21 to 24 in positions where the first to fourth support units 21 to 24 can turn about the corresponding shaft portions 31d (clamped). These positions constitute initial positions of the first to fourth support units 21 to 24 in their turning direction.

In STEP 2, at the spoke angle deviation amount measuring system 2, the first to fourth tires 11 to 14 are unclamped, the shaft portions 31d of the first to fourth support units 21 to 24 are unclamped, and the centering of the first to fourth support units 21 to 24 is locked.

Next, the control device 27 drives the moving mechanism 38 based on an instruction from the operator and positions of the eight positioning shafts 37 of the positioning device 26 in positions where the positioning shafts 37 are spaced apart from the positioning recessed portions 33a of the positioning plates 33 (STEP 3). This unlocks the centering of the first to fourth support units 21 to 24, whereby the first to fourth support units 21 to 24 can turn about the corresponding shaft portions 31d.

In STEP 3, at the spoke angle deviation amount measuring system 2, the first to fourth tires 11 to 14 are unclamped, the shaft portions 31d of the first to fourth support units 21 to 24 are clamped, and the centering of the first to fourth support units 21 to 24 is unlocked.

Then, the control device 27 drives the left moving mechanism 51 and the right moving mechanism 52 based on an instruction from the operator to move the first to fourth clamp units 41 to 44 to positions where the first to fourth clamp units 41 to 44 are brought into abutment with the first to fourth tires 11 to 14 to clamp them (STEP 4). This enables the first to fourth tires 11 to 14 to rotate while being clamped in relation to the left-and-right direction.

In STEP 4, at the spoke angle deviation amount measuring system 2, the first to fourth tires 11 to 14 are clamped, the shaft portions 31d of the first to fourth support units 21 to 24 are clamped, and the centering of the first to fourth support units 21 to 24 is unlocked.

Next, the operator performs the forward travel accelerator pedal control to cause the vehicle 3 to travel forwards, and measures a spoke angle deviation amount while the forward travel accelerator pedal control is being performed (STEP 5). Performing the forward travel accelerator pedal control causes the first to fourth tires 11 to 14 to rotate in the counterclockwise direction when seen from the left side, and a measurement, which will be described later, is executed in this state. In STEP 5, the clamped and unclamped states at the spoke angle deviation amount measuring system 2 are the same as those in STEP 4.

In the case where the first to fourth tires 11 to 14 are inclined at a toe angle with respect to the front-and-rear direction with the steering wheel 4 positioned neutral, when the forward travel accelerator pedal control is performed, lateral stress is exerted on the first to fourth support units 21 to 24.

As illustrated in FIG. 6, when lateral stress is exerted on the first to fourth support units 21 to 24, the first to fourth support units 21 to 24 turn individually about the corresponding shaft portions 31d. In this embodiment, the turning unit configured to turn the tire support unit according to the lateral stress comprises the support table 31, the support rollers 32 and the positioning cap 55. The configuration of the turning unit can be modified as required, and for example, the turning unit may be made up, for example, of a turning table on which a tire support unit is mounted and which is configured to turn according to lateral stress, a stress sensor configured to detect lateral stress and a pressurizing unit configured to apply a force to the tire support unit according to the result of a detection by the stress sensor to turn it.

In STEP 5, after the forward travel accelerator pedal control has been performed for a predetermined period of time, the angle sensor 40 detects turning angles of the first to fourth support units 21 to 24 from their initial positions. The detected turning angle data is transmitted to the control device 27.

The initial positions of the first to fourth support units 21 to 24 denote a state where first to fourth axes A1 to A4 which pass through the respective shaft portions 31d of the first to fourth support units 21 to 24 and extend in the front-to-rear direction of the units 21 to 24 become parallel to a system axis A5 which extends in the front-to-rear direction at a center of the spoke angle deviation amount measuring system 2 in the left-and-right direction (refer to FIG. 5). The first to fourth axes A1 to A4 change their directions when the first to fourth support units 21 to 24 turn about the respective shaft portions 31d of the first to fourth support units 21 to 24.

A turning angle $\theta_{FL}$ of the first support unit 21 is an angle formed by a left parallel axis A6 which is parallel to the system axis A5 and which passes through the respective shaft portions 31d of the first and third support units 21, 23 and a first axis A1. A turning angle $\theta_{RL}$ of the third support unit 23 is an angle formed by the left parallel axis A6 and a third axis A3.

A turning angle $\theta_{FR}$ of the second support unit 22 is an angle formed by a right parallel axis A7 which is parallel to the system axis A5 and which passes through the respective shaft portions 31d of the second and fourth support units 22, 24 and a second axis A2. A turning angle $\theta_{RR}$ of the fourth support unit 24 is an angle formed by the right parallel axis A7 and a fourth axis A4.

The control device 27 calculates $\theta_{TOTAL}$ which denotes an amount of deviation of an average between $\theta_{FL}$ and $\theta_{FR}$ to an average between $\theta_{RL}$ and $\theta_{RR}$ and β which denotes an amount of deviation of spoke angle by use of Expression 1 and Expression 2 below. In this embodiment, an expression for calculating a spoke angle deviation amount β, that is, β=α−((θ1−θ2)/G) is a combination of Expression 1 and Expression 2. In this embodiment, a spoke angle deviation amount calculation unit for calculating a spoke angle deviation amount is made up of the control device 27.

In Expression 2, α denotes a steering angle (zero in this embodiment) of the steering wheel 4, and $G_{RATIO}$ denotes a steering reduction gear ratio denoting a steering angle change relative to a toe angle change of the vehicle. In this embodiment, for example, $G_{RATIO}$ is 18. In addition, for various angles, a clockwise rotation denotes positive.

$$\theta_{TOTAL}=\theta_{FL}+\theta_{FR}-\theta_{RL}-\theta_{RR} \quad \text{(Expression 1)}$$

$$\beta=\alpha-((\theta_{TOTAL}/G_{RATIO})) \quad \text{(Expression 2)}$$

For example, assuming that $\theta_{FL}$, $\theta_{FR}$ and $\theta_{RL}$ are −1°, and $\theta_{RR}$ is +0.5°, $\theta_{TOTAL}$=−1−1+−0.5=−1.5, and β=0−(−1.5/18)=0.0833.

The calculated β (the spoke angle deviation amount) is stored in a memory (not shown) of the control device 27. The control device 27 executes the β calculation control described above once per rotation while the first to fourth tires 11 to 14 rotate several full rotations (for example, 10 rotations). Then, the control device 27 calculates an average of 10 β's so calculated (spoke angle deviation amounts). The control device 27 repeats the average value calculation control.

As illustrated in FIG. 7, after he or she has adjusted the wheel alignment by use of a known method, the operator adjusts the toe angle of the vehicle 3 according to the calculated average value of β (the spoke angle deviation amount) (STEP 6). The toe angle is adjusted by loosening a toe angle adjustment nut. The clamping and unclamping states at the spoke angle deviation amount measuring system 2 in STEP 6 are the same as those in STEP 4. The toe angle may be adjusted automatically by use of an adjustment device.

In this embodiment, since the toe angle is adjusted with the first to fourth tires 11 to 14 kept rotating, the number of manhours can be reduced, compared with a case where the toe angle is adjusted with the first to fourth tires 11 to 14 stopped rotating, whereafter the first to fourth tires 11 to 14 are caused to rotate again to execute the average value calculation control described above to thereby confirm the spoke angle deviation amount.

The operator adjusts the toe angle and thereafter fastens the toe angle adjusting nut to complete the toe angle adjustment (STEP 7). The clamping and unclamping states at the spoke angle deviation amount measuring system 2 in STEP 7 are the same as those in STEP 4.

Next, the control device 27 drives the moving mechanism 38 based on an instruction from the operator to move the eight positioning shafts 37 in such a manner that the positioning shafts 37 are inserted into the respective pairs of positioning recessed portions 33a of the first to fourth support units 21 to 24 (STEP 8). This locks the centering of the first to fourth support units 21 to 24.

In addition, in STEP 8, the control device 27 drives the moving mechanism 56 to move the four positioning caps 55 to the positions where the four positioning caps 55 are spaced apart from the respective shaft portions 31d of the first to fourth support units 21 to 24 to release the positioning of the shaft portions 31d. Further, in STEP 8, the control device 27 drives the left moving mechanism 51 and the right moving mechanism 52 to move the first to fourth clamp units 41 to 44 to the positions where the first to fourth clamp units 41 to 44 are spaced apart from the first to fourth tires 11 to 14, respectively. This unclamps the first to fourth tires 11 to 14.

In STEP 8, at the spoke angle deviation amount measuring system 2, the first to fourth tires 11 to 14 are unclamped, the shaft portions 31d of the first to fourth support units 21 to 24 are unclamped, and the centering of the first to fourth support units 21 to 24 is locked (the clamping and unclamping states in STEP 8 become the same as those in STEP 1).

In this embodiment, the vehicle 3 is set on the spoke angle deviation amount measuring system 2 with the steering wheel 4 positioned neutral, and the travel forward accelerator pedal control is performed to cause the vehicle 3 to travel forwards, whereby a spoke angle deviation amount of the steering wheel 4 can be measured, thereby making it possible to measure the spoke angle deviation amount easily.

In this embodiment, since the shaft portions 31d which constitute the centers of rotation of the first to fourth support units 21 to 24 are positioned rotatably after the vehicle 3 has arrived at the measuring position, the turning angles of the first to fourth support units 21 to 24 can be detected accurately, compared with one in which the shaft portions 31d are positioned before the vehicle 3 arrives at the measuring position or one in which the shaft portions 31d are not positioned even after the vehicle 3 has arrived at the measuring position.

In this embodiment, although the first to fourth tires 11 to 14 are supported rotatably by the pairs of support rollers 32, the first to fourth tires 11 to 14 may each be supported rotatably by a single support roller. Further, the first to fourth tires 11 to 14 may be supported rotatably by a rotatable belt member.

In the embodiment that has been described heretofore, the spoke angle deviation amount is calculated by use of Expression 1 and Expression 2, the present invention is not limited to this. For example, a configuration may be adopted in which data of a plurality of spoke angle deviation amounts corresponding to a plurality of values for turning angles of the first to fourth support units 21 to 24 is stored in the memory (not shown) of the control device 27, and when turning angles of the first to fourth support units 21 to 24 are detected, the control device 27 retrieves spoke angle deviation amounts corresponding to the detected turning angles from the memory to calculate spoke angle deviation amounts.

What is claimed is:

1. A spoke angle deviation amount measuring system for measuring a spoke angle deviation amount of a steering wheel when a vehicle is in a straight traveling state, the vehicle having a plurality of tires configured to rotate in a forward rotational direction about a first axis extending in a lateral direction as a center of rotation when the vehicle is traveling forwards and to rotate in a reverse rotational direction about the first axis as a center of rotation when the vehicle is reversing, the spoke angle deviation amount measuring system comprising:

a plurality of tire support units each having a tire support rotational member provided so as to rotate in the reverse rotational direction and configured to support each of the plurality of tires so as to rotate in the forward rotational direction by rotating in the reverse rotational direction and each configured to turn about a second axis extending in a vertical direction as a center of rotation;

a turning unit configured to rotate each of the plurality of tires supported by the tire support rotational member in the forward rotational direction with a spoke angle of the steering wheel being zero and the steering wheel staying neutral and in a case where a lateral stress is generated in each of the plurality of tire support units, to turn each of the plurality of tire support units about the second axis as a center of rotation from its initial position according to the generated lateral stress;

a turning angle detection unit configured to detect a turning angle of each of the plurality of tire support units from its initial position in a case where each of the plurality of tire support units is turned about the second axis as a center of rotation by the turning unit; and a spoke angle deviation amount calculation unit configured to calculate a spoke angle deviation amount of the steering wheel based on the detected turning angle, detected by the turning angle detection unit.

2. The spoke angle deviation amount measuring system according to claim 1, comprising:

a spoke angle measuring unit configured to measure a spoke angle of the steering wheel, wherein the steering wheel is positioned in a neutral state based on the spoke angle measured by the spoke angle measuring unit.

3. The spoke angle deviation amount measuring system according to claim 1, wherein each of the plurality of tire support units is provided movably, and comprises:

a fixing unit configured to fix a position of each of the plurality of tire support units to the second axis and release the fixing of the position of each of the plurality of tire support units to the second axis, and wherein the fixing unit releases the fixing of the position of each of the plurality of tire support units to the second axis with each of the plurality of tires not being supported on the corresponding tire support rotational member and fixes the position of each of the plurality of tire support units to the second axis with each of the plurality of tires being supported on the corresponding tire support rotational member.

4. The spoke angle deviation amount measuring system according to claim 1, wherein the spoke angle deviation amount calculation unit calculates a spoke angle deviation amount of the steering wheel by use of Expression (1) below:

$$\beta = \alpha - ((\theta1 - \theta2)/G) \qquad \text{(Expression 1)}$$

where $\theta1$ denotes the detected turning angle of a tire support unit among the plurality of tire support units which supports a front tire of the plurality of tires, $\theta2$ denotes the detected tuning angle of a tire support unit of the plurality of tire support units which supports a rear tire of the plurality of tires, $\alpha$ denotes a steering angle of the steering wheel, $G$ denotes a steering reduction gear ratio indicating a steering angle change to a toe angle change of the vehicle, and $\beta$ denotes a spoke angle deviation amount of the steering wheel.

* * * * *